Dec. 3, 1957     S. GROUP ET AL     2,814,924
ROTARY DISC TYPE GRASS CUTTER
Filed Jan. 3, 1957     2 Sheets-Sheet 1
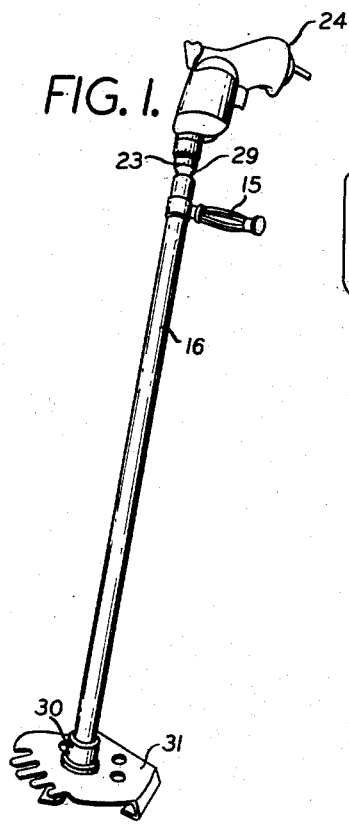
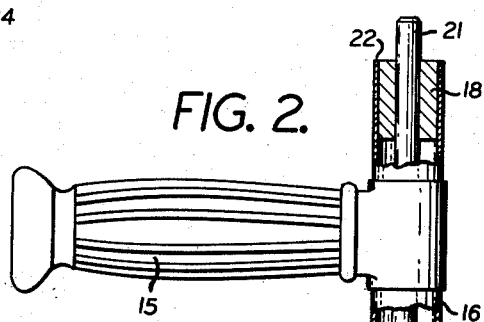
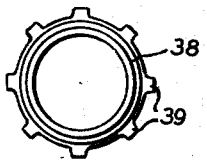
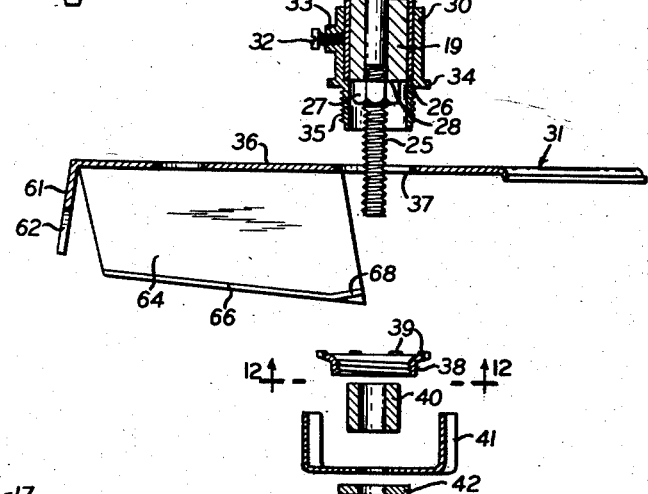
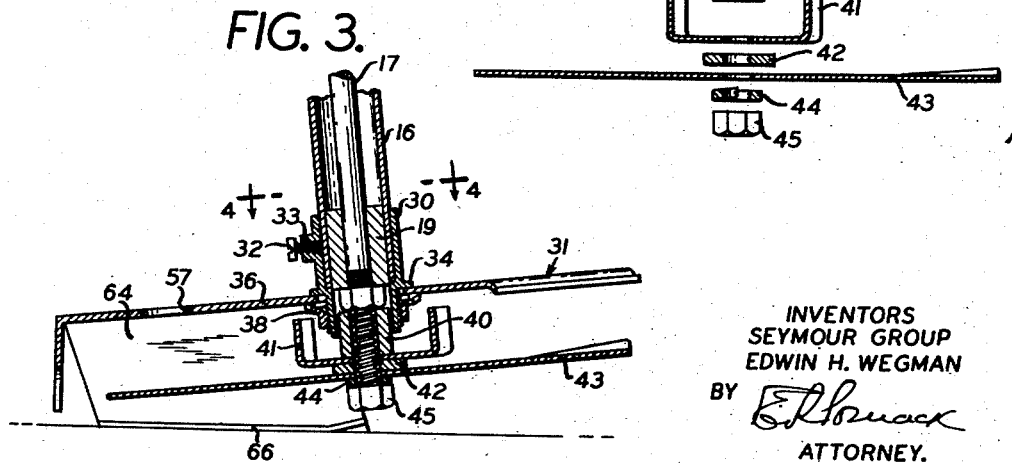
INVENTORS
SEYMOUR GROUP
EDWIN H. WEGMAN
BY 
ATTORNEY.

Dec. 3, 1957 S. GROUP ET AL 2,814,924
ROTARY DISC TYPE GRASS CUTTER
Filed Jan. 3, 1957 2 Sheets-Sheet 2
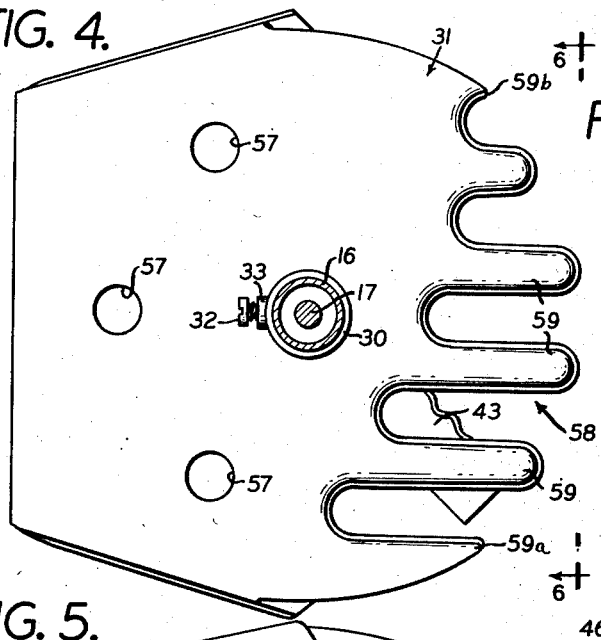
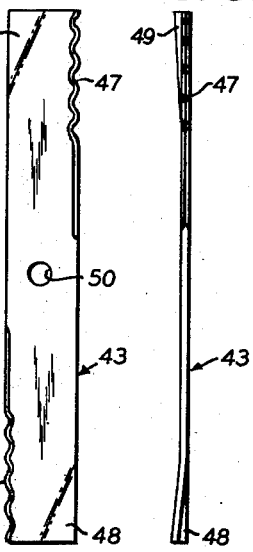
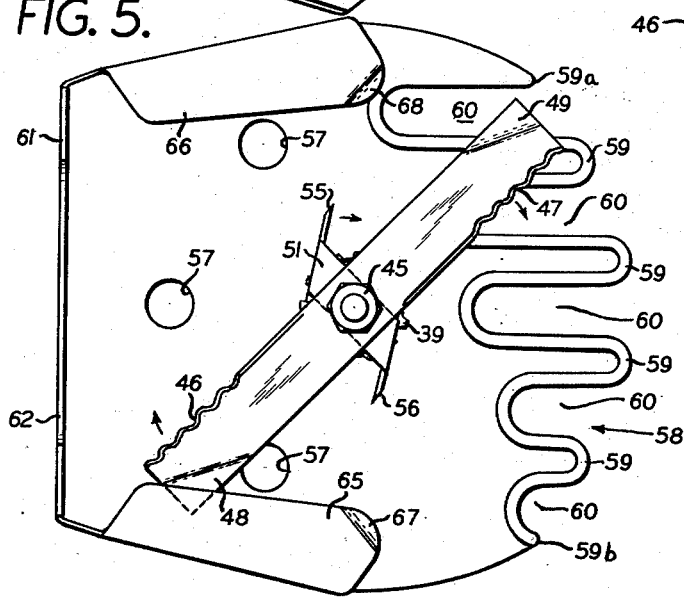
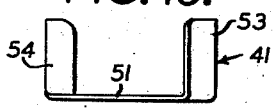
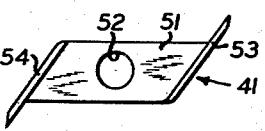
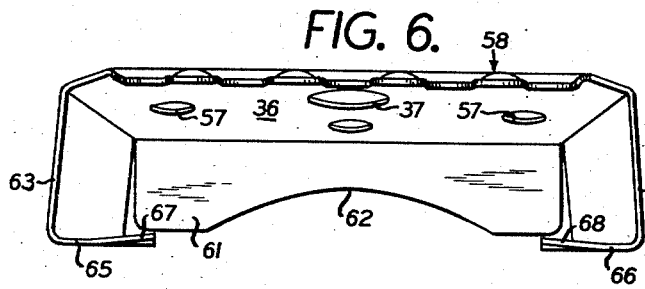
INVENTORS
SEYMOUR GROUP
EDWIN H. WEGMAN
BY
ATTORNEY.

United States Patent Office 2,814,924
Patented Dec. 3, 1957

2,814,924

ROTARY DISC TYPE GRASS CUTTER

Seymour Group, Wantagh, and Edwin H. Wegman, Freeport, N. Y., assignors to The S. J. Wegman Company, Lynbrook, N. Y., a copartnership Application January 3, 1957, Serial No. 632,391

4 Claims. (Cl. 56—25.4)

This invention relates to grass cutters, and is particularly directed to devices for the trimming of lawn edges.

Conventional lawn mowers are so constructed as to make it difficult, if not impossible, properly to trim lawn edges or portions of a lawn adjacent a wall or fence, or under shrubbery; and it is accordingly generally necessary to use a pair of hand shears for cutting and trimming operations in these regions. Aside from the fact that the use of such hand methods entails the inconvenience of stooping to perform the cutting operation, the process is time-consuming and does not always result in even cutting. To meet this problem complicated mechanical devices with built-in motors have been devised, these being generally costly and difficult to handle.

It is the object of this invention to provide a relatively simple and inexpensive trimmer which has none of the disadvantages hereinabove set forth, and which can be easily operated, without any special skill, to effectively perform cutting and trimming operations at edges of lawns, driveways and walks, portions of a lawn adjacent a building or fence, and under shrubs and in other normally relatively inaccessible places. And it is our objective to enable the operator of our device to remain in an erect position, without the necessity of stooping, during the entire cutting operation, and to operate the device not only while standing, but also while walking when that is necessary for continuous cutting along extended regions.

It is a further objective of our invention to provide a device with a motor remote from the cutting blade, so as to keep the grass cuttings from clogging the motor parts. And in this aspect of our invention it is our objective to enable our cutting apparatus to be coactively employed with a standard electric hand drill, whereby the latter can be readily attached to the device and operated by the flick of a switch.

It is a further object of our invention to provide means for maintaining the blades of grass being cut in an upright position, thereby to facilitate the cutting operation. And in this last-mentioned aspect of our invention it is a further object to prevent long severed blades of grass from being wrapped around the shaft of the device, as frequently occurs with conventional rotary grass cutters.

Another object of our invention is to enable the cutting operation to be performed without danger of injury to the operator, or damage to adjacent delicate blooms. And in the accomplishment of this objective we employ a novel arrangement of safety guard means which serves its intended protective purpose without in any way interfering with the cutting action of the blade means.

Another objective of this invention is to enable the device to be adjusted for different cutting heights, and to enable a selected height to be maintained, whereby the cut grass will have a uniform appearance.

It is also our objective to provide a device of this category that has a minimum of vibration, that can operate at high speeds, and that can be moved along the lawn with a minimum of effort and without damage to the lawn.

Other objects, features and advantages will appear from the drawings and the description hereinafter given.

Referring to the drawings,

Figure 1 is a perspective view of the trimmer constituting our invention shown operatively connected to an electric hand drill.

Figure 2 is an enlarged fragmentary elevational view, with parts broken away and shown in section, of the components of our invention.

Figure 3 is a view of the lower portion of the device shown in Figure 2 with the elements in assembled relation.

Figure 4 is a section of Fig. 3 taken along line 4—4.

Figure 5 is a bottom view of Fig. 3.

Figure 6 is a front elevational view of the guard member of our invention, shown looking in the direction of arrows 6—6 of Fig. 4.

Figure 7 is a plan view of the main cutting blade of our invention.

Figure 8 is a side edge view of Fig. 7.

Figure 9 is an enlarged end view of Fig. 7.

Figure 10 is an elevational view of the auxiliary cutter member of our invention.

Figure 11 is a bottom view of Fig. 10.

Figure 12 is an enlarged bottom view of the locking nut member shown looking in the direction of arrows 12—12 of Fig. 2.

In the embodiment of our invention illustrated, the handle 15 is attached to the elongated tubular casing 16 through which extends the drive shaft 17, the latter being maintained in axial position by the respective upper and lower bearing bushings 18 and 19, respectively, and the intermediate yieldable ring 20, the later being of absorbent material and oil soaked to provide lubrication, and also serving to reduce vibration by virtue of its yieldable engagement with said drive shaft 17. The said bushings 18 and 19 are fixedly secured to the inner wall of the tube 16 by any known means, and the ring 20 is preferably, although not necessarily, of compressed felt material in frictional engagement with the inner wall of the tube 16 and the adjacent peripheral surface of the shaft 17. The upper terminal portion 21 of drive shaft 17 extends above the top 22 of the casing 16, said terminal portion 21 being proportioned to be operatively received and engaged by the chuck member 23 of the electric hand drill 24. No details are shown of the chuck construction nor the manner of its engagement with the said terminal 21, inasmuch as the chuck and engaging mechanism are well known to those skilled in the art, and further because a detailed description of such construction is not necessary for an understanding of the present invention.

The lower terminal portion 25 of drive shaft 17 is threaded, and extends downwardly beyond the bottom edge 26 of tube 16 for receiving, in a manner to be hereinafter described, the cutting blades. In threaded engagement with said lower terminal portion 25 is the nut 27, the latter being in underlying engagement with the bottom surface 28 of bushing 19. The arrangement is such that the nut 27 prevents an upward longitudinal movement of drive shaft 17 and the parts carried thereby relative to the casing 16—a downward movement being prevented by the chuck collar 29 of the drill member 24. The selected position of nut 27 on the threaded portion 25 determines the position of the drive shaft 17 with respect to the casing 16—and accordingly also determines, as will hereinafter appear, the position of the cutting blades with respect to the ground.

Affixed over the lower portion of casing 16 is the fitting 30 serving as a support for guard member 31. Fitting 30, secured to casing 16 by set screw 32 extending through the boss 33 and into frictional engagement with said casing 16, contains the annular flange 34 and the downwardly extending threaded nipple 35. The arrangement in the assembled device is such that the flange 34 rests upon the upper substantially horizontal wall 36 of said guard member 31, the threaded terminal 25 of the drive shaft extending downwardly through the apertured portion 37 disposed in substantially the central portion of wall 36. The retaining nut 38 is in threaded engagement with the said nipple 35, the upper peripheral portion 39 of the nut being in pressing engagement with the undersurface of wall 36 to provide a firm mounting for guard member 31 upon the fitting 30.

Mounted upon the said threaded terminal portion 25 of the drive shaft 17, below nut 27, are the spacer 40, auxiliary cutting blade 41, washer 42, main cutting blade 43, lock washer 44 and terminal nut 45. When these parts are operatively assembled in place, and the nut 45 tightened, the auxiliary blade 41 and main blade 43 are fixed in relation to drive shaft 17, so that a rotation of the drive shaft will cause a corresponding operative rotary movement of said blades. In the embodiment illustrated the body of blade 43 extends within a plane substantially parallel to that of upper wall 36 of the guard member. The said auxiliary blade is substantially U-shaped.

The main blade 43 is, in its preferred form, a flat elongated member containing at the opposite leading edges thereof the preferably serrated cutting sections 46 and 47, the opposite trailing corners 48 and 49, respectively, being bent upwardly out of the plane of the body of blade 43 (Figs. 7 to 9), so as to form fins. The central portion of the blade contains a hole 50 through which said threaded terminal portion 25 of the drive shaft extends.

The auxiliary blade 41 contains a flat body portion 51—with a central hole 52 to accommodate said terminal portion 25—and two upstanding inclined cutting portions 53 and 54 with the respective cutting edges 55 and 56. It will be noted that body portion 51 of auxiliary blade 41 is separated from the main blade 43 by the washer 42.

The top wall 36 of the guard member 31 contains a plurality of perforations 57 therein, these being adapted to permit an upward flow of air caused by the action of said upwardly bent fins 48 and 49, as will more clearly hereinafter appear. The front portion of wall 36 contains a grass comb 58 comprising the generally forwardly directed spaced fingers 59, 59a and 59b, forming therebetween spaces generally designated 60. Guard member 31 also has a rear guard wall 61 with a recessed central section 62, and two side guard walls 63 and 64 also serving as legs and having inwardly directed flanged skids 65 and 66, respectively, the innermost portions 67 and 68, respectively, of said skids being turned upward slightly. The said skids 65 and 66 are slightly inclined with respect to the top wall 36 of the guard member 31, the arrangement being such that when said skids are operatively on the ground, as indicated in Fig. 3, the top wall 36 will be inclined with respect to the ground, whereby the casing 16 together with the associated parts will be inclined rearwardly, as indicated in Figs. 1 and 3.

In the operative use of this device, the electric drill member 24 is attached to the upper terminal 21 of the drive shaft, and the device placed upon the ground where the grass is to be trimmed. When the drill member 24 is set into operation, the drive shaft 17 will be caused to rotate, thereby causing a rotation of blades 41 and 43. During the rotation of main blade 43, upstanding blades of grass will be cut when engaged by the serrated cutting sections 46 and 47. The guard is so positioned as to enable the spaces 60 of the comb 58 to receive therethrough said upstanding blades of grass, the teeth 59, 59a and 59b supporting said grass blades and thereby coacting with the cutting sections 46 and 47 of the cutting tool 43 as they rotatively pass across and below the front comb section 58.

The entire device is slidably moved along the ground on said skids 65 and 66 in a forward direction, whereby the grass will be progressively cut, in the manner aforesaid, as the comb section 58 is brought into engagement with the upstanding blades of grass. Since the outermost circumferential path of the main blade 43 extends forwardly beyond the casing 16, grass can be cut along an edge in spaced relation to said casing 16, particularly since the cutting sections of blade 43 pass close to the extreme forward portions of the comb 58. In other words, the arrangement is such as to permit the ready cutting of any portion of the lawn which can be reached by the fingers of said comb portion 58—making this tool particularly suitable for the trimming of edges, areas adjacent to walls and fences, and portions below overhanging bushes and other normally comparatively inaccessible regions. During the forward movement of said device, there is no danger of damage to the lawn, not only because of the smooth undersurface of skids 65 and 66, but also because the tips 67 and 68 of the leading edges of said skids will not dig into the ground, inasmuch as they are upwardly bent.

Uncut portions of the grass blades behind the comb portion 58 will be cut by the said cutting sections 46 and 47 while they are operatively moving at the rear portion of the guard member. The fins 48 and 49 tend to create an updraft, the movement of air being directed upwardly and outwardly through the said perforations 47—thereby not only obviating the danger of back pressures, but also tending to cause blades of grass in the path of said updraft to be maintained in a vertical position, thereby facilitating the cutting action.

The auxiliary blade 41 is employed to prevent long cut grass sections from wrapping themselves about the rotating shaft portions, such as the spacer 50—said vertical portions 53 and 54 not only serving as a barrier to keep the grass blades away from the rotating shaft and associated parts, but also cutting any such grass blades that may be disposed in their respective paths. Hence the problem frequently encountered with conventional rotary mowers in the removal of entwined grass is eliminated with this apparatus. It will further be noted that said auxiliary blade 41 is, in the preferred embodiment illustrated, disposed inwardly from said comb portion 58, so as not to interfere with the above-described function of the latter.

Should it be desired to alter the height of the main cutting blade 43, the position of nut 27 can be changed, within the limits of the device, to suit the requirements. For example, if the nut 27 were to be positioned at a higher section of threaded terminal portion 25 of drive shaft 17 than illustrated, said drive shaft would be correspondingly lowered with respect to the guard member 31 and the ground, whereby cutting blade 43 also would be lowered. It is of course evident that to lower shaft 17 it is necessary also to slightly raise the grasping position of the chuck 23 of drill 24 on the upper terminal 21 of the shaft.

The structure above described thus presents a convenient device for grass cutting and trimming operations, without the inconvenience of stooping to reach normally remote or inaccessible areas. Moreover, since there is no motor in the region of the cutting tool, the common disadvantage of grass-clogged motor parts of conventional constructions is obviated. And, as aforesaid, the device can be continuously used without the need for repeated removing of grass cuttings, in view of the action of auxiliary blade 41 above described.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

We claim:

1. In a grass cutter adapted for use with an electric hand drill, an elongated casing, a drive shaft rotatably supported axially therein and having an upper terminal portion and a lower terminal portion, said lower terminal portion extending below said casing, the upper terminal portion of said shaft being positioned and proportioned for operative connection to said hand drill, a guard member having an upper substantially horizontal wall, a downwardly depending wall, and extending inwardly from said latter wall a skid member for slidable engagement with the ground, said skid member being inclined with respect to said upper wall of the guard member, said guard member being mounted at the bottom of said casing with said upper wall substantially normal to the longitudinal extent of said casing, whereby when said skid is operatively on the ground the said casing will be tilted with respect thereto, and a cutting-blade operatively mounted on said lower terminal portion of said shaft.

2. In a grass cutter adapted for use with an electric hand drill, an elongated casing, a drive shaft rotatably supported therein and having an upper terminal portion and a lower terminal portion, said lower terminal portion extending below said casing, the upper terminal portion of said shaft being positioned and proportioned for operative connection to said hand drill, a guard member having an upper wall and a leg portion depending therefrom and adapted for resting upon the ground, said guard member being mounted on the bottom of said casing above said lower terminal portion of said shaft, a main cutting blade substantially horizontally mounted on said lower terminal portion of said shaft, and an auxiliary blade mounted on said lower terminal portion above said main cutting blade, said auxiliary blade having an upstanding cutting portion.

3. In a grass cutter adapted for use with an electric hand drill, the combination according to claim 2, said auxiliary blade being of substantially U-shaped configuration and comprising a body portion secured to said lower terminal of the shaft and two legs in spaced relation to said lower terminal and extending upwardly from said body portion in the general direction of the axis of said shaft.

4. In a grass cutter adapted for use with an electric hand drill, an elongated casing, a drive shaft rotatably supported therein and having an upper terminal portion and a lower terminal portion, said lower terminal portion extending below said casing, the upper terminal portion of said shaft being positioned and proportioned for operative connection to said hand drill, a guard member having an upper wall and a leg portion depending therefrom and adapted for resting upon the ground, said guard member being mounted at the bottom of said casing above said lower terminal portion of said shaft, a main cutting blade substantially horizontally mounted on said lower terminal portion of said shaft, an auxiliary blade mounted on said lower terminal portion above said main cutting blade, said auxiliary blade having an upstanding cutting portion, said upper wall of the guard member having at the front thereof a comb portion comprising a plurality of spaced forwardly extending fingers, said main cutting blade being disposed below said upper wall and having a cutting section movable along a path extending directly below said fingers, said auxiliary blade being disposed inwardly of said comb portion, whereby it is in non-obstructing relation thereto.

References Cited in the file of this patent
UNITED STATES PATENTS

| | | |
|---|---|---|
| 1,871,606 | Haddad | Aug. 16, 1932 |
| 2,062,820 | Pierce | Dec. 1, 1936 |
| 2,519,779 | Moon | Aug. 22, 1950 |
| 2,645,010 | Holmes | July 14, 1953 |
| 2,673,396 | Beres | Mar. 30, 1954 |
| 2,702,978 | Fowler | Mar. 1, 1955 |